Patented July 4, 1933

1,916,689

UNITED STATES PATENT OFFICE

GEORGE SCHNEIDER, OF MONTCLAIR, NEW JERSEY, ASSIGNOR TO CELANESE CORPORATION OF AMERICA, A CORPORATION OF DELAWARE

PROCESS OF RIPENING A CELLULOSE ESTER AND THE PRODUCT THEREOF

No Drawing. Original application filed November 5, 1927, Serial No. 231,397. Divided and this application filed July 2, 1930. Serial No. 465,447.

This invention relates to the manufacture of organic esters of cellulose such as cellulose acetate and relates more particularly to the so called ripening operation wherein the solubility characteristics of the cellulose esters are modified.

This application is a division of my prior application 231,397 filed Nov. 5, 1927.

An object of my invention is to provide a method of ripening, hydrolyzing or modifying the solubility characteristics of cellulose acetate or other organic esters of cellulose.

Further objects of my invention will appear from the following detailed description.

According to the present invention improved products are obtained by effecting the ripening in two stages, in the first of which the ripening agent is added to the acetylation or esterification mixture and the whole allowed to stand until the cellulose ester is partially ripened, and in the second stage the product precipitated from the first stage is further ripened in the presence of dilute acid. By this means I have found that degradation of the cellulose molecule is reduced to a minimum, and in addition products are obtained which are very valuable, particularly for incorporation in lacquers.

The following example shows a method of carrying out my invention. The actual method of esterification used in this example is designed to produce a cellulose ester of low viscosity characteristics, however the method of ripening or hydrolyzing is equally applicable to the production of other organic esters of cellulose.

*Example*

100 parts of cotton linters, wood pulp or reconstituted cellulose with or without previous preparation, such as activation with acids and/or alkalies, are added to a mixture of 300 to 400 parts of acetic anhydride and 300 to 400 parts of acetic acid containing from 10 to 15 parts of sulphuric acid. The temperature to which this mixture is cooled before the cellulose is added is determined by experiment with the particular cellulose used, so that the maximum temperature reached in the reaction does not exceed 50° to 55° C. After this point has been reached the temperature is maintained between about 40 to 55° C. for about 2 hours or longer depending somewhat on the nature of the cellulose used. The mass is then lowered to a ripening temperature of below 20 to 30° C. and a small quantity of water (say from 10 to 40 parts), or water containing acetic acid and/or hydrogen peroxide is added for ripening in the usual manner. The ripening is interrupted by precipitating the mass with water at a stage when a sample is soluble in hot chloroform and soluble in a hot mixture of equal parts of alcohol and benzene containing a small amount of water. From the solubility properties it is evident that the cellulose acetate has undergone only a mild hydrolysis. The precipitated product is then subjected to ripening in the presence of dilute acid. At the completion of this ripening the product displays a very slight plasticity in hot chloroform and is soluble in a hot mixture of equal parts of alcohol and benzene without the addition of any water and is soluble in various other organic solvents, such as acetone, methyl acetate etc.

In a similar manner cellulose formate, formed by the use of formic acid in the esterification, or cellulose propionate or butyrate formed with the aid of a corresponding organic acid anhydride, or other organic esters of cellulose may be ripened.

It is to be understood that the foregoing detailed description is given merely by way of illustration and that many variations may be made therein without departing from the spirit of this invention.

Having described my invention what I claim and desire to secure by Letters Patent is:

1. In the process of partially hydrolyzing cellulose acetate, conducting the operation in two stages, in the first of which there is added to the liquid product of acetylation a quantity of water sufficient to produce a mild hydrolysis and when this hydrolysis has occurred the acetate is precipitated by adding much water, while in the second stage the precipitated acetate is further hydrolyzed by treatment with dilute acid.

2. In the process for producing esters of cellulose, the steps of adding water or similarly acting substances to the reaction mixture containing the esterified cellulose after the esterification has been performed, allowing the same to stand until the cellulose ester is partially ripened, separating the cellulose ester and then completing the ripening thereof in the presence of weak acid.

3. Process for producing cellulose acetate comprising acetylating cellulose by means of acetic anhydride, adding a small proportion of water to the reaction mixture, allowing the mixture to stand until the cellulose acetate is partially ripened, precipitating the cellulose acetate by the addition of water, and completing the ripening of the cellulose acetate in the presence of weak acid.

4. In a process for the production of cellulose acetate as claimed in claim 3, so conducting the ripening operation that the end product exhibits only a slight or very slight plasticity in hot chloroform and is soluble in acetone, methyl acetate and a mixture of alcohol and benzene.

5. Process for producing and treating organic esters of cellulose comprising esterifying cellulose and after completion of esterification adding a ripening agent to the reaction mixture and permitting the same to stand until the organic ester of cellulose is partially ripened, separating the organic ester of cellulose and completing the ripening in presence of dilute acid.

6. Process for producing and treating cellulose acetate comprising esterifying cellulose and after completion of esterification adding a ripening agent to the reaction mixture and permitting the same to stand until the cellulose acetate is partially ripened, separating the cellulose acetate and completing the ripening in presence of dilute acid.

7. Organic esters of cellulose which have been partially hydrolyzed in two stages, in the first of which there is added to the liquid product of esterification a quantity of water to produce a mild hydrolysis and in the second stage the organic ester of cellulose is further hydrolyzed by treatment with dilute acid.

8. Cellulose acetate which has been partially hydrolyzed in two stages, in the first of which there is added to the liquid product of esterification a quantity of water to produce a mild hydrolysis and in the second stage the cellulose acetate is further hydrolyzed by treatment with dilute acid.

In testimony whereof, I have hereunto subscribed my name.

GEORGE SCHNEIDER.